(12) United States Patent
Oohashi et al.

(10) Patent No.: US 6,700,296 B1
(45) Date of Patent: Mar. 2, 2004

(54) AC GENERATOR FOR VEHICLE

(75) Inventors: Atsushi Oohashi, Tokyo (JP); Yoshihito Asao, Tokyo (JP); Katsumi Adachi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 36 days.

(21) Appl. No.: 10/130,945
(22) PCT Filed: Sep. 26, 2000
(86) PCT No.: PCT/JP00/06609
§ 371 (c)(1), (2), (4) Date: May 24, 2002
(87) PCT Pub. No.: WO02/29960
PCT Pub. Date: Apr. 11, 2002

(51) Int. Cl.$^7$ ................................................. H02K 1/22
(52) U.S. Cl. ................... 310/263; 310/261; 310/156.66
(58) Field of Search ............................ 310/261, 263, 310/156.66

(56) References Cited

U.S. PATENT DOCUMENTS

| | | | | |
|---|---|---|---|---|
| 3,303,369 A | * | 2/1967 | Erickson | 310/168 |
| 5,977,669 A | * | 11/1999 | Yoshida et al. | 310/68 D |
| 5,994,802 A | * | 11/1999 | Shichijyo et al. | 310/51 |
| 6,023,119 A | * | 2/2000 | Asao | 310/216 |
| 6,114,786 A | * | 9/2000 | Ishida et al. | 310/71 |
| 6,121,699 A | * | 9/2000 | Kashihara et al. | 310/68 D |
| 6,127,763 A | * | 10/2000 | Nakamura et al. | 310/263 |
| 6,157,111 A | * | 12/2000 | Asao | 310/263 |
| 6,184,600 B1 | * | 2/2001 | Asao et al. | 310/64 |
| 6,198,187 B1 | * | 3/2001 | Asao et al. | 310/68 D |
| 6,333,582 B1 | * | 12/2001 | Asao et al. | 310/263 |
| 6,337,529 B1 | * | 1/2002 | Higashino et al. | 310/254 |

FOREIGN PATENT DOCUMENTS

| | | | | |
|---|---|---|---|---|
| JP | 08098481 A | * | 4/1996 | H02K/21/04 |
| JP | 11164499 A | * | 6/1999 | H02K/1/14 |

* cited by examiner

*Primary Examiner*—Thomas M. Dougherty
*Assistant Examiner*—J. Aguirrechea
(74) *Attorney, Agent, or Firm*—Sughrue Mion, PLLC (57) ABSTRACT

An object of the present invention is to provide an automotive alternator achieving high output by overlapping a laminated core of a stator and yoke portion of a field rotor in an axial direction, and enabling electromagnetic noise to be reduced by prescribing dimensional relationships in the field rotor.

In this automotive alternator, a ratio (R2/R1) between an outer radius R2 of a cylindrical portion of a Lundell-type core and an outer radius R1 of the Lundell-type core is set to a range from 0.50 to 0.54, and a ratio (Tr/Tp) between an axial overlap length Tr between the laminated core of the stator and the yoke portions of the Lundell-type core and an axial length Tp of the yoke portions is set to a range greater than or equal to 0.2.

18 Claims, 7 Drawing Sheets

AC GENERATOR FOR VEHICLE

TECHNICAL FIELD

The present invention relates to an automotive alternator, and particularly to a Lundell-type core construction of an automotive alternator enabling claw resonance noise generated by magnetic attraction force force acting on claw-shaped magnetic poles to be reduced by improving the magnetic balance of magnetic attraction force.

BACKGROUND ART

In recent years, due to noise reduction in engines and the accompanying reduction of sound insulation equipment, the lowering of noise in automotive alternators mounted to the engines is in demand. Noise in automotive alternators can be classified roughly into two groups including wind noise generated by fans and electromagnetic noise, and higher harmonic electromagnetic noise is particularly a problem, being harsh in tone.

Generally, it is known that magnetic attraction force proportional to rotational frequency is generated in automotive alternators in air-gap portions between claw-shaped magnetic pole portions of a field rotor and teeth of a laminated core of a stator, electromagnetic noise being generated by component parts resonating at their excitation frequencies. It is difficult to avoid resonance in component parts in automotive alternators because the working rotational frequency range is spread over 1,000 to 20,000 revolutions per minute (rpm). In a field rotor, in which the resonating frequency is comparatively high, the claw-shaped magnetic pole portions resonate in the vicinity of 9,000 rpm. Because the noise level of this electromagnetic noise is affected by the magnitude of the vibrational amplitude, it is important to suppress vibrations to reduce electromagnetic noise.

Thus, attempts have been made conventionally to reduce electromagnetic noise by engaging a vibration-suppressing ring in an interior portion of the claw-shaped magnetic pole portions to shift the resonating frequency of the claw-shaped magnetic pole portions to a frequency band higher than the working rotational frequency range, or to reduce electromagnetic noise by applying a resin to the claw-shaped magnetic pole portions to dampen vibration of the claw-shaped magnetic pole portions.

However, from the viewpoint of improving output, automotive alternators of this kind are generally designed such that the axial length of the laminated core of the stator is shorter than the axial length of the claw-shaped magnetic pole portions, and the outer radius of cylindrical portions is smaller than the outer radius of the field rotor, structurally making for constructions which vibrate easily. Thus, since magnetic attraction force is concentrated at tip portions of the claw-shaped magnetic pole portions and the vibrational amplitude in the radial direction increases, and in addition, the distance from the cylindrical portions to the claw-shaped magnetic pole portions is great, vibrational amplitude in an axial direction resulting from magnetic attraction force is increased, preventing electromagnetic noise from being reduced effectively even if the countermeasures described above are applied.

An attempt is proposed in Japanese Patent Laid-Open No. HEI 11-164499, for example, to try to achieve high output by making the laminated core of the stator and the yoke portions of the field rotor face each other to minimize the magnetic flux leaking outside from the yoke portions and thereby increase the rate of recovery of the magnetic flux generated by the field rotor.

Figure 14:
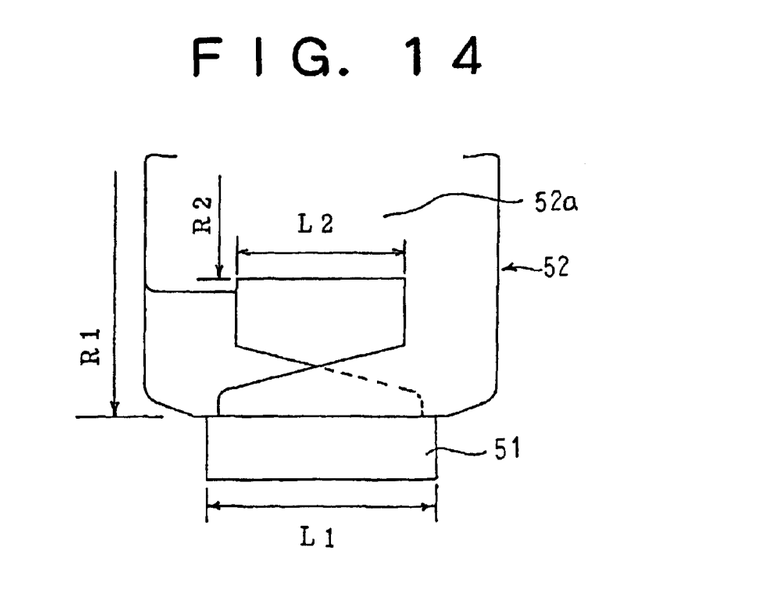
FIG. 14 is a schematic diagram showing dimensional relationships in a stator and a field rotor in a conventional automotive alternator.

In Japanese Patent Non-Examined Laid-Open No. HEI 11-164499, as shown in FIG. 14, it is stated that high output can be achieved by setting a ratio between an axial length L1 of a laminated core 51 of a stator and an axial length L2 of cylindrical portions 52a of a Lundell-type core 52 to a range from 1.25 to 1.75 and setting a ratio between an outer radius R1 of the Lundell-type core 52 and an outer radius R2 of the cylindrical portions 52a to a range from 0.54 to 0.60.

However, no comment has been made in Japanese Patent Non-Examined Laid-Open No. HEI 11-164499 about reducing electromagnetic noise resulting from vibration of the claw-shaped magnetic pole portions.

DISCLOSURE OF THE INVENTION

An object of the present invention is to provide an automotive alternator achieving high output by overlapping a laminated core of a stator and yoke portions of a field rotor in an axial direction, and enabling electromagnetic noise to be reduced by prescribing dimensional relationships in the field rotor.

According to one aspect of the present invention, there is provided an automotive alternator including:
  a field rotor provided with:
    a field coil; and
    a Lundell-type core having:
      a cylindrical portion on which the field coil is installed;
      yoke portions disposed so as to extend radially outward from axial end portions of the cylindrical portion; and
      claw-shaped magnetic pole portions disposed so as to extend axially from radial edge portions of the yoke portions so as to surround the field coil; and
  a stator composed of a laminated core and an armature coil disposed facing an outer circumference of the claw-shaped magnetic pole portions,
  wherein a ratio (R2/R1) between an outer radius R2 of the cylindrical portion and an outer radius R1 of the Lundell-type core is in a range from 0.50 to 0.54, and
  a ratio (Tr/Tp) between an axial overlap length Tr between the laminated core and the yoke portions and an axial length Tp of the yoke portions is in a range greater than or equal to 0.2.

According to another aspect of the present invention, there is provided an automotive alternator including:
  a field rotor provided with:
    a field coil; and
    a Lundell-type core having:
      a cylindrical portion on which the field coil is installed;
      yoke portions disposed so as to extend radially outward from axial end portions of the cylindrical portion; and
      claw-shaped magnetic pole portions disposed so as to extend axially from radial edge portions of the yoke portions so as to surround the field coil; and
  a stator composed of a laminated core and an armature coil disposed facing an outer circumference of the claw-shaped magnetic pole portions,
  wherein a ratio (Tt/R1) between a radial dimension Tt of a root portion of the claw-shaped magnetic pole portions and an outer radius R1 of the Lundell-type core is in a range from 0.1 to 0.15, and a ratio (Tr/Tp) between an axial overlap length Tr between the laminated core and the yoke portions and an axial length Tp of the yoke portions is in a range greater than or equal to 0.2.

According to yet another aspect of the present invention, there is provided an automotive alternator including:

a field rotor provided with:
   a field coil; and
   a Lundell-type core having:
      a cylindrical portion on which the field coil is installed;
      yoke portions disposed so as to extend radially outward from axial end portions of the cylindrical portion; and
      claw-shaped magnetic pole portions disposed so as to extend axially from radial edge portions of the yoke portions so as to surround the field coil; and
a stator composed of a laminated core and an armature coil disposed facing an outer circumference of the claw-shaped magnetic pole portions,
wherein a ratio (R3/R1) between a bottom portion outer radius R3 of a valley portion between the daw-shaped magnetic pole portions and an outer radius RI of the Lundell-type core is in a range from 0.55 to 0.65, and
a ratio (Tr/Tp) between an axial overlap length Tr between the laminated core and the yoke portions and an axial length Tp of the yoke portions being in a range greater than or equal to 0.2.

BEST MODE FOR CARRYING OUT THE INVENTION

The preferred embodiments of the present invention will now be explained with reference to the drawings.

Embodiment 1

Figure 1:
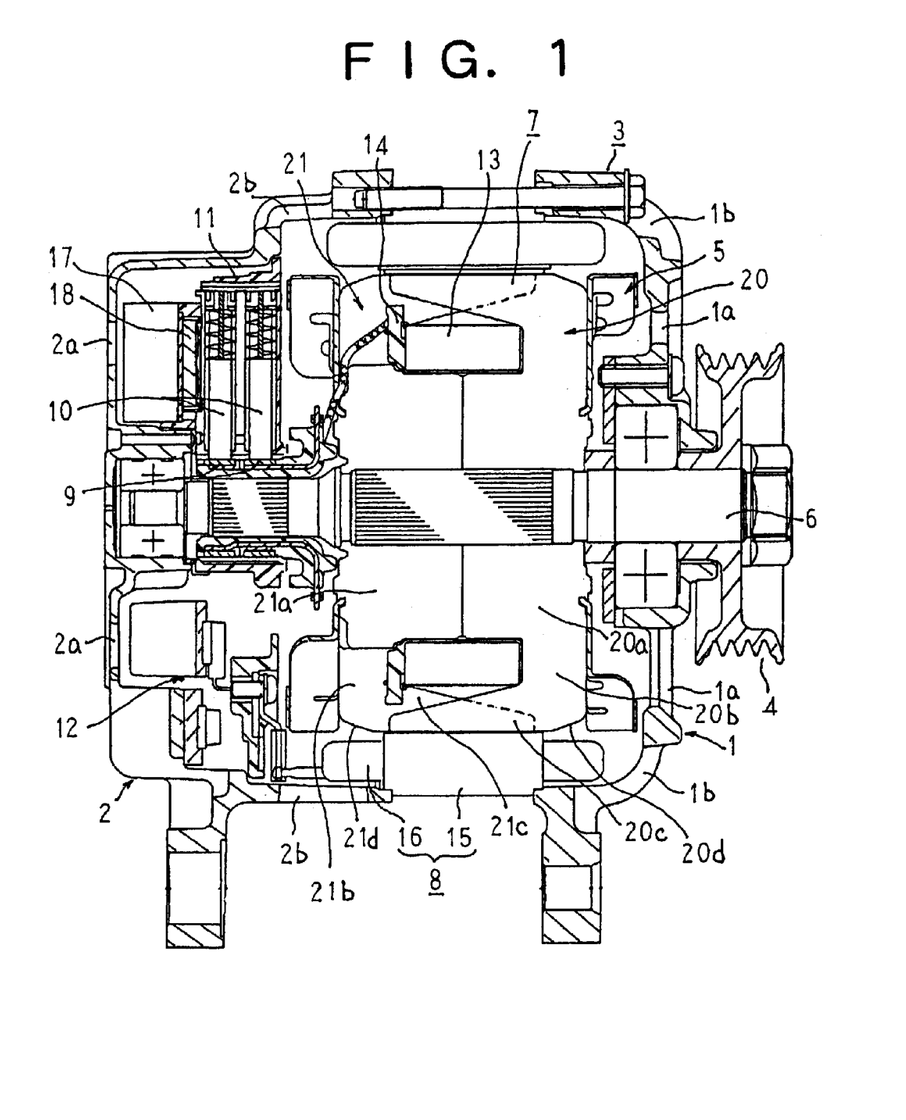
FIG. 1 is a longitudinal section showing an automotive alternator according to Embodiment 1 of the present invention.

FIG. 1 is a longitudinal section showing an automotive alternator according to Embodiment 1 of the present invention.

In FIG. 1, an automotive alternator is constructed by rotatably mounting a field rotor 7 by means of a shaft 6 inside a case 3 constituted by a front bracket 1 and a rear bracket 2 made of aluminum and fixing a stator 8 to an inner wall surface of the case 3 so as to cover an outer circumferential side of the field rotor 7.

The shaft 6 is rotatably supported in the front bracket 1 and the rear bracket 2. A pulley 4 is fixed to one end of this shaft 6, enabling rotational torque from an engine to be transmitted to the shaft 6 by means of a belt (not shown).

Slip rings 9 for supplying an electric current to the field rotor 7 are fixed to another end portion of the shaft 6, a pair of brushes 10 being housed in a brush holder 11 disposed inside the case 3 so as to slide in contact with these slip rings 9. A regulator 18 for adjusting the magnitude of an alternating voltage generated in the stator 8 is fixed by adhesive to a heat sink 17 fitted into the brush holder 11. A rectifier 12 for converting an alternating current generated in the stator 8 into a direct current is electrically connected to the stator 8 and is mounted inside the case 3.

The field rotor 7 is constituted by: a field coil 13 for generating magnetic flux on passage of an electric current; and a pair of pole cores 20 and 21 disposed so as to cover the field coil 13 functioning as a Lundell-type core in which magnetic poles are formed by the magnetic flux generated in the field coil 13. The pole cores 20 and 21 are made of iron, being constituted by: cylindrical portions 20a and 21a; yoke portions 20b and 21b disposed at a predetermined pitch in a circumferential direction, each being disposed so as to extend radially outward from an axial end portion of one of the cylindrical portions; and claw-shaped magnetic pole portions 20c and 21c disposed so as to extend axially from a radial edge portion of each of the yoke portions 20b and 21b, the cylindrical portions 20a and 21a being abutted and fixed to the shaft 6 such that the claw-shaped magnetic pole portions 20c and 21c intermesh. The field coil 13 is wound onto a bobbin 14 and installed on the cylindrical portions 20a and 21a. Cooling fans 5 are fixed to both axial end portions of the pole cores 20 and 21.

The stator 8 is constituted by: a cylindrical laminated core 15 in which a large number of slots having grooves lying in an axial direction are disposed in a circumferential direction; and an armature coil 16 in which conducting wires are installed in the slots of this laminated core 15 and an alternating current is generated by changes in the magnetic flux from the field rotor 7 accompanying rotation of the field rotor 7.

In the automotive alternator constructed in this manner, an electric current is supplied to the field coil 13 from a battery (not shown) by means of the brushes 10 and the slip rings 9, generating a magnetic flux. The claw-shaped magnetic pole portions 20c of the pole core 20 are magnetized into North-seeking N) poles by this magnetic flux, and the claw-shaped magnetic pole portions 21c of the pole core 21 are magnetized into South-seeking (S) poles. At the same time, rotational torque from the engine is transmitted to the shaft 6 by means of the belt and the pulley 4, rotating the field rotor 7. Thus, a rotating magnetic field is imparted to the armature coil 16, generating an electromotive force in the armature coil 16. This alternating-current electromotive force passes through the rectifier 12 and is converted into a direct current, and the magnitude thereof is adjusted by the regulator 18, charging the battery.

In the automotive alternator, the field coil 13, the armature coil 16, the rectifier 12, and the regulator 18 constantly generate heat during power generation. Thus, air intake apertures 1a and 2a and air discharge apertures 1b and 2b are disposed in the front bracket 1 and the rear bracket 2 in order to cool the heat generated by power generation.

Figure 2:
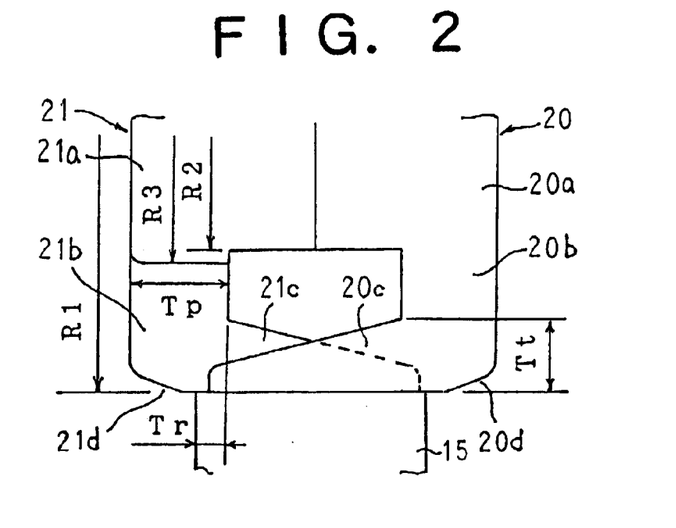
FIG. 2 is a schematic diagram showing dimensional relationships in a Lundell-type core in the automotive alternator according to Embodiment 1 of the present invention.

Here in Embodiment 1, the dimensional relationships between each portion of the pole cores 20 and 21 shown in FIG. 2 are set as follows.

A ratio (R2/R1) between an outer radius R2 of the cylindrical portions 20a and 21a and an outer radius R1 of the pole cores 20 and 21 is set to a range from 0.50 to 0.54. A ratio (Tt/R1) between a radial dimension Tt of a root portion of the claw-shaped magnetic pole portions 20c and 21c and the outer radius R1 of the pole cores 20 and 21 is set to a range from 0.1 to 0.15. A ratio (R3/R1) between a bottom portion outer radius R3 of the valley portions between the claw-shaped magnetic pole portions 20c and 21c and the outer radius R1 of the pole cores 20 and 21 is set to a range from 0.55 to 0.65. A ratio (Tr/Tp) between an axial overlap length Tr between the laminated core 15 and the yoke portions 20b and 21b and an axial length Tp of the yoke portions 20b and 21b is set to 0.2 or greater.

Because the dimensional relationships between each portion of the pole cores 20 and 21 are set as described above, vibration of the claw-shaped magnetic pole portions 20c and 21c is reduced without reducing output, thereby providing an automotive alternator enabling electromagnetic noise resulting from claw resonance noise to be reduced.

Next, FIGS. 3 to 7 are results confirming the effects of Embodiment 1.

Figure 3:
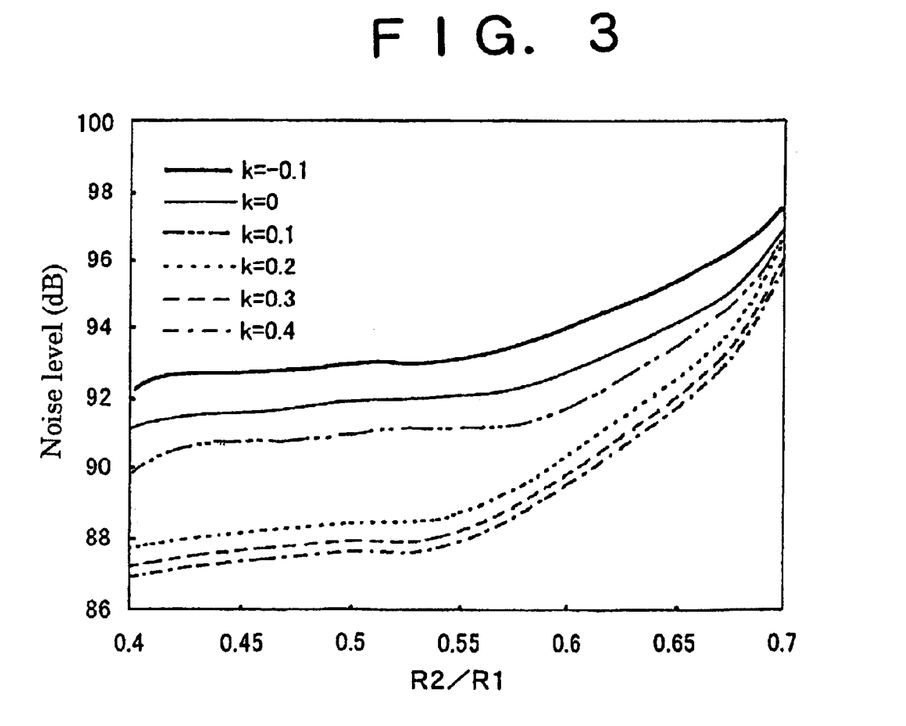
FIG. 3 is a graph showing a relationship between R2/R1 and noise level in the automotive alternator according to Embodiment 1 of the present invention.
Figure 4:
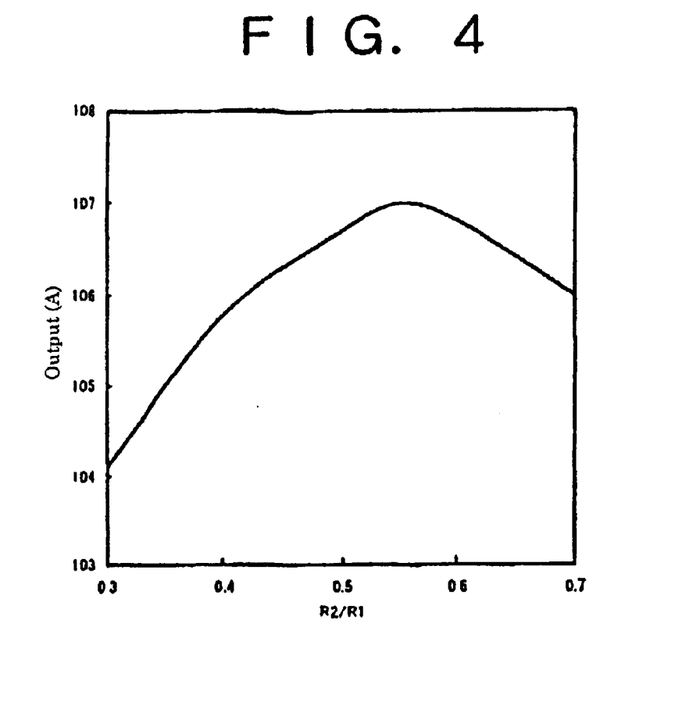
FIG. 4 is a graph showing a relationship between R2/R1 and output current in the automotive alternator according to Embodiment 1 of the present invention.

FIG. 3 is a graph showing a relationship between (R2/R1) and noise level when Tr/Tp (hereinafter "k") is at predetermined values (−0.1, 0, 0.1, 0.2, 0.3, and 0.4), R2/R1 being presented on the horizontal axis and noise level being presented on the vertical axis. Moreover, the noise level is the peak measured value of electromagnetic noise up to 10,000 rpm. FIG. 4 is a graph showing a relationship between (R2/R1) and output current at 2,000 rpm when k=0.2, R2/R1 being presented on the horizontal axis and output current being presented on the vertical axis.

From FIG. 3, it can be seen that the noise level is substantially saturated and registers as a constant value when R2/R1 is equal to or less than 0.54, and suddenly increases when 0.54 is exceeded. This is because an increase in R2/R1 means a shortening of the radial length of the yoke portions 20b and 21b. In other words, when the radial length of the yoke portions 20b and 21b is shortened, the contact surface area between the bobbin 14 on which the field coil 13 is installed and the yoke portions 20b and 21b is reduced, reducing the damping effect of the bobbin 14. It can be inferred that when R2/R1 exceeds 0.54, the damping effect of the bobbin 14 is reduced, and the magnetic noise level increases because vibration of the claw-shaped magnetic pole portions 20c and 21c is not damped. From this, it can be seen that the noise level can be reduced by making R2/R1 equal to or less than 0.54.

Furthermore, from FIG. 3, it can be seen that the noise level decreases as k is increased, and the noise level is saturated when k is equal to or greater than 0.2. This is because an increase in k means an increase in the amount of axial overlap between the yoke portions 20b and 21b and the laminated core 15. It can be inferred that when k is equal to or less than zero, magnetic flux flows to the laminated core 15 from tip portions of the claw-shaped magnetic pole portions 20c and 21c because the yoke portions 20b and 21b and the laminated core 15 do not overlap in an axial direction, concentrating magnetic attraction force on the tip portions of the claw-shaped magnetic pole portions 20c and 21c, thereby increasing radial vibration of the claw-shaped magnetic pole portions 20c and 21c. It can also be inferred that when k exceeds zero, the amount of magnetic flux flowing into the laminated core 15 from the tip portions of the claw-shaped magnetic pole portions 20c and 21c decreases proportionately because the yoke portions 20b and 21b and the laminated core 15 overlap in an axial direction and magnetic flux flows into the laminated core 15 from root ends of the claw-shaped magnetic pole portions 20c and 21c, reducing radial vibration of the claw-shaped magnetic pole portions 20c and 21c. From this, it can be seen that the noise level can be reduced by making k equal to or greater than 0.2.

From FIG. 4, it can also be seen that the output current reaches a maximum value when R2/R1 is in the vicinity of 0.54. This is because reducing R2/R1 means reducing the outer radius of the cylindrical portions 20a and 21a. It is desirable for R2/R1 to be equal to or greater than 0.50 because if R2/R1 is too small, the passage cross-sectional area of the magnetic flux flowing through the cylindrical portions 20a and 21a is reduced, magnetically saturating the cylindrical portions 20a and 21a and preventing output from being obtained. It is also desirable for R2/R1 to be equal to or less than 0.6 because if R2/R1 is too large, the thickness of the claw-shaped magnetic pole portions 20c and 21c becomes too thin when the volume of the field coil 13 is maintained at a predetermined value, magnetically saturating the claw-shaped magnetic pole portions 20c and 21c and preventing output from being obtained.

Consequently, from FIGS. 3 and 4, an automotive alternator having high output and low electromagnetic noise can be achieved by making R2/R1 equal to or greater than 0.50 and equal to or less than 0.54 and k equal to or grater than 0.2.

Figure 5:
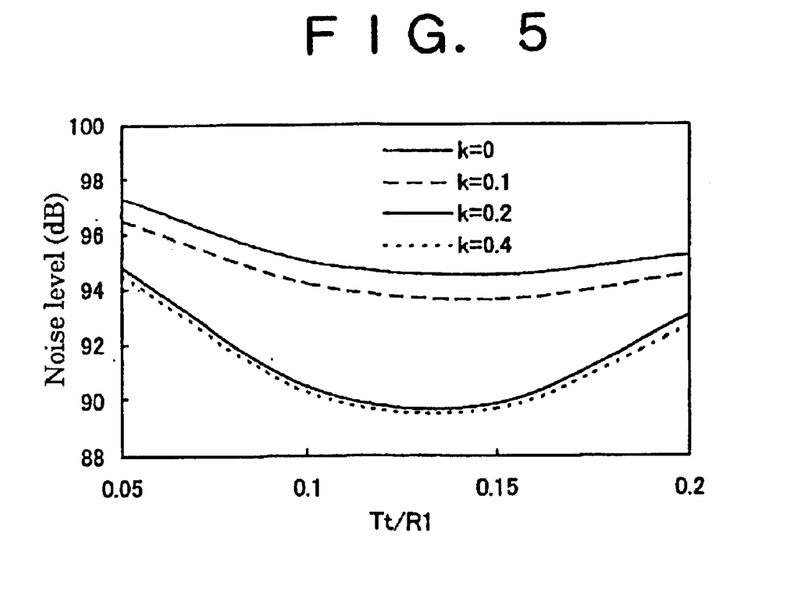
FIG. 5 is a graph showing a relationship between Tt/R1 and noise level in the automotive alternator according to Embodiment 1 of the present invention.

FIG. 5 is a graph showing the relationship between (Tt/R1) and noise level when k is at predetermined values (0, 0.1, 0.2, and 0.4), Tt/R1 being presented on the horizontal axis and noise level being presented on the vertical axis. Moreover, the noise level is the peak measured value of electromagnetic noise up to 10,000 rpm.

From FIG. 5, it can also be seen that the noise level reaches a minimum value when Tt/R1 is in the vicinity of 0.13. This is because reducing Tt/R1 means reducing the thickness of the claw-shaped magnetic pole portions 20c and 21c. It is desirable for Tt/R1 to be equal to or greater than 0.10 because if Tt/R1 is too small, the rigidity of the claw-shaped magnetic pole portions 20c and 21c is reduced, increasing vibration (the noise level) of the claw-shaped magnetic pole portions 20c and 21c. It is also desirable for Tt/R1 to be equal to or less than 0.15 because if Tt/R1 is too large, then the weight of the claw-shaped magnetic pole portions 20c and 21c as a whole becomes too heavy and the vibrational pivot points are shifted radially inward, increasing vibrational amplitude, thereby increasing the noise level. When k is less than 0.2, magnetic flux flows to the laminated core 15 from the tip portions of the claw-shaped magnetic pole portions 20c and 21c, concentrating magnetic attraction force on the tip portions of the claw-shaped magnetic pole portions 20c and 21c, thereby increasing radial vibration of the claw-shaped magnetic pole portions 20c and 21c, and when k is equal to or greater than 0.2, because magnetic flux flows into the laminated core 15 from root portions of the claw-shaped magnetic pole portions 20c and 21c, the amount of magnetic flux flowing into the laminated core 15 from the tip portions of the claw-shaped magnetic pole portions 20c and 21c decreases proportionately, reducing radial vibration of the claw-shaped magnetic pole portions 20c and 21c. Consequently, it can be seen that the noise level can be reduced by making k equal to or greater than 0.2.

Consequently, from FIG. 5, an automotive alternator having high output and low electromagnetic noise can be achieved by making Tt/R1 equal to or greater than 0.10 and equal to or less than 0.15 and k equal to or greater than 0.2.

Figure 6:
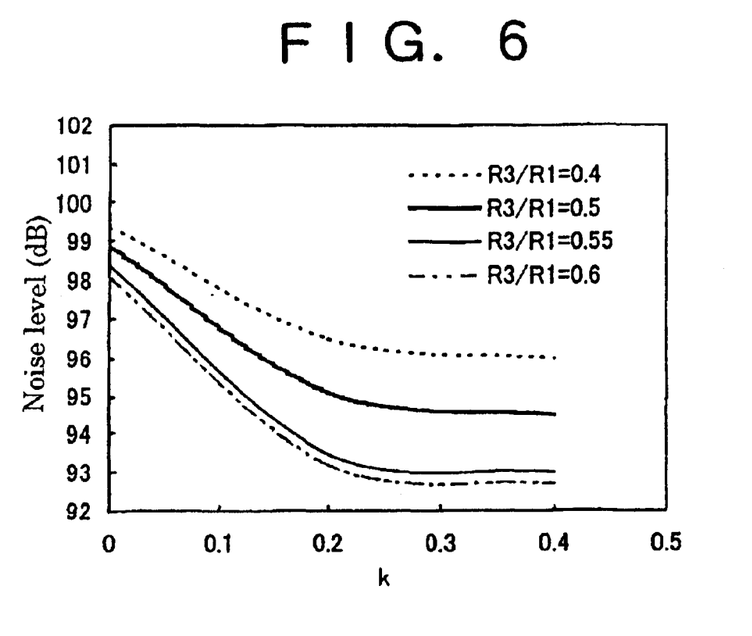
FIG. 6 is a graph showing a relationship between k and noise level in the automotive alternator according to Embodiment 1 of the present invention.
Figure 7:
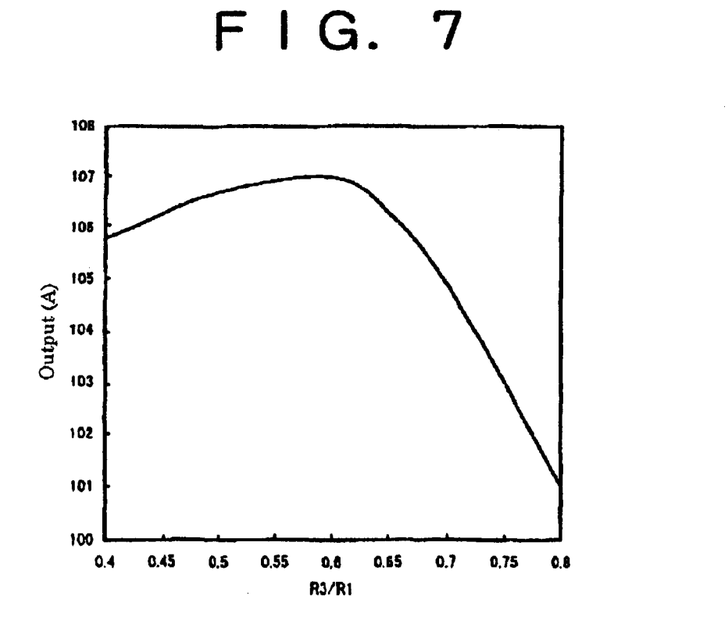
FIG. 7 is a graph showing a relationship between R3/R1 and output current in the automotive alternator according to Embodiment 1 of the present invention.

FIG. 6 is a graph showing the relationship between k and noise level when R3/R1 is at predetermined values (0.4, 0.5, 0.55, 0.6), k being presented on the horizontal axis and noise level being presented on the vertical axis. Moreover, the noise level is the peak measured value of electromagnetic noise up to 10,000 rpm. FIG. 7 is a graph showing the relationship between (R3/R1) and output current at 2,000 rpm when k equals 0.2, R3/R1 being presented on the horizontal axis and output current being presented on the vertical axis.

From FIG. 6, it can be seen that the noise level is substantially saturated and registers as a constant value when k is equal to or greater than 0.2, and suddenly increases at less than 0.2. This is a result of the fact that when k is less than 0.2, magnetic flux flows to the laminated core 15 from the tip portions of the claw-shaped magnetic pole portions 20c and 21c, concentrating magnetic attraction force on the tip portions of the claw-shaped magnetic pole portions 20c and 21c, thereby increasing radial vibration of the claw-shaped magnetic pole portions 20c and 21c, and when k is equal to or greater than 0.2, because magnetic flux flows into the laminated core 15 from root portions of the claw-shaped magnetic pole portions 20c and 21c, the amount of magnetic flux flowing into the laminated core 15 from the tip portions of the claw-shaped magnetic pole portions 20c and 21c decreases proportionately, reducing radial vibration of the claw-shaped magnetic pole portions 20c and 21c. Furthermore, a reduction in R3/R1 means a reduction in the bottom portion outer radius of valley portions 21e between the yoke portions 20b and 21b. In other words, if the bottom portion outer radius of the valley portions 21e is reduced, the radial length of the yoke portions 20b and 21b becomes proportionately longer, increasing axial vibration of the claw-shaped magnetic pole portions 20c and 21c. It can be inferred that when R3/R1 is less than 0.55, axial vibration of the claw-shaped magnetic pole portions 20c and 21c increases, increasing the magnetic noise level. From this, it can be seen that the noise level can be reduced by making R3/R1 equal to or greater than 0.55 and k equal to or greater than 0.2.

Figure 8:
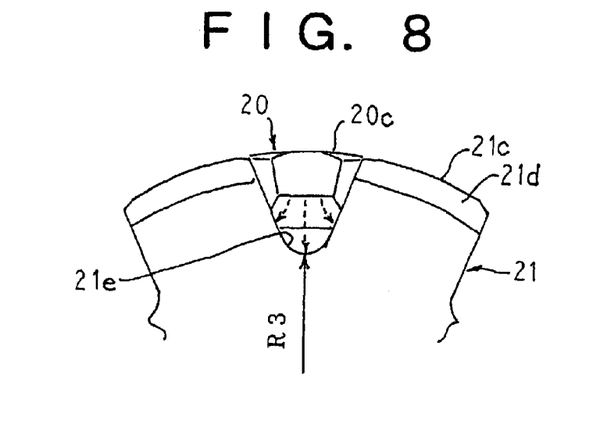
FIG. 8 is a schematic diagram explaining magnetic flux leakage between claw-shaped magnetic pole portions and cylindrical portions in the automotive alternator according to Embodiment 1 of the present invention.

From FIG. 7, it can also be seen that the output current reaches a maximum value when R3/R1 is in the vicinity of 0.6. This is because reducing R3/R1 means a reduction in the bottom portion outer radius of valley portions 21e and a narrowing of a circumferential width of the yoke portions 20b and 21b. Thus, it is desirable for R3/R1 to be equal to or greater than 0.45 because if R3/R1 is too small, the passage cross-sectional area of the magnetic flux flowing through the yoke portions 20b and 21b is reduced, magnetically saturating the yoke portions 20b and 21b and preventing output from being obtained. It is also desirable for R3/R1 to be equal to or less than 0.65 because if R3/R1 is too large, as shown in FIG. 8, gaps between the claw-shaped magnetic pole portions 20c and the bottom portions of the valley portions 21e become narrow, increasing magnetic flux leakage due to a portion of the magnetic flux flowing into the laminated core 15 from the claw-shaped magnetic pole portions 20c instead flowing into the pole cores 21 by means of the valley portions 21e and preventing output from being obtained.

Consequently, from FIGS. 6 and 7, an automotive alternator having high output and low electromagnetic noise can be achieved by making R3/R1 equal to or greater than 0.55 and equal to or less than 0.65 and k equal to or greater than 0.2.

Furthermore, in Embodiment 1, shoulder portions 20d and 21d are formed by chamfering outermost diameter portions of axial end surfaces of the pole cores 20 and 21. Thus, wind-splitting noise generated at the outermost diameter portions of the axial end surfaces of the pole cores 20 and 21 due to rotation of the field rotor 7 is reduced, enabling an automotive alternator having low wind noise to be achieved.

Embodiment 2

Figure 9:
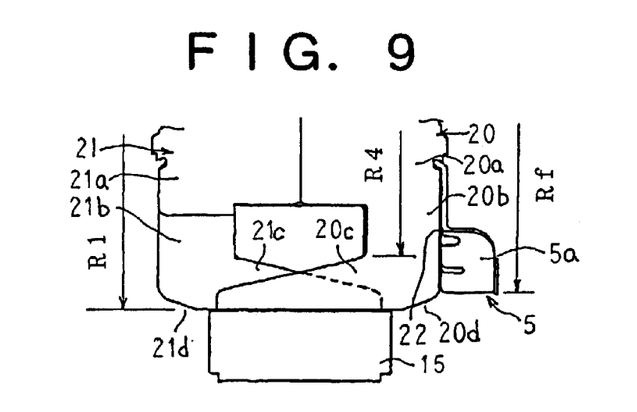
FIG. 9 is a schematic diagram showing dimensional relationships in a field rotor in an automotive alternator according to Embodiment 2 of the present invention.

In Embodiment 2, as shown in FIG. 9, an outermost radial dimension Rf of the cooling fans 5 mounted to the axial end surfaces of the pole cores 20 and 21 is set to a range greater than R4 and less than R1, the shoulder portions 20d and 21d are formed by chamfering the outermost radial portions of the axial end surfaces of the pole cores 20 and 21 starting from the outermost radial positions of the cooling fans 5, and an elastic resin 22 such as a silicone resin is interposed between the cooling fans 5 and the pole cores 20 and 21. Here, R4 is an inner radial dimension of the root portions of the claw-shaped magnetic pole portions 20c and 21c. Moreover, the rest of the construction is constructed in a similar manner to Embodiment 1 above.

In Embodiment 2, an outermost radial dimension Rf of the cooling fans 5 mounted to the axial end surfaces of the pole cores 20 and 21 is set to a range greater than R4 and less than R1. In other words, the cooling fans 5 are fixed to the axial end surfaces of the pole cores 20 and 21 so as to reach from the cylindrical portions 20a and 21a of the pole cores 20 and 21 across the yoke portions 20b and 21b to part of the root portions of the claw-shaped magnetic pole portions 20c and 21c. Hence, claw resonance noise is reduced because axial vibrations in which the root portions of the yoke portions 20b and 21b are pivot points are suppressed.

Claw resonance noise is further reduced because the elastic resin 22 interposed between the cooling fans 5 and the axial end surfaces of the pole cores 20 and 21 acts as a damper, damping the axial vibrations in which the root portions of the yoke portions 20b and 21b are the pivot points.

In addition, because the shoulder portions 20d and 21d are formed by chamfering the outermost radial portions of the axial end surfaces of the pole cores 20 and 21 starting from the outermost radial positions of the cooling fans 5, cooling airflow passages on the discharge side of the cooling fans 5 are enlarged in a circumferential direction, reducing ventilation resistance. Thus, the flow velocity of cooling airflows flowing along blades 5a of the cooling fans 5 from the inner radial side to the outer radial side increases, enabling the cooling airflows to flow smoothly along the blades 5a. Hence, reductions in the overall flow rate of the cooling airflows are suppressed, improving the cooling efficiency of the cooling fans 5. Furthermore, the cooling airflows are discharged from the discharge side of the cooling fans 5 so as to spread in an axial direction, a portion thereof being supplied to the coil end groups 16f and 16r of the armature coil 16 along the shoulder portions 20d and 21d. Hence, temperature increases in the armature coil 16 are suppressed effectively.

Moreover, in Embodiment 2 above, an elastic resin 22 such as a silicone resin is interposed between the cooling fans 5 and the pole cores 20 and 21, but the resin 22 may also be a varnish, for example, provided that it is elastic.

Embodiment 3

Figure 10:
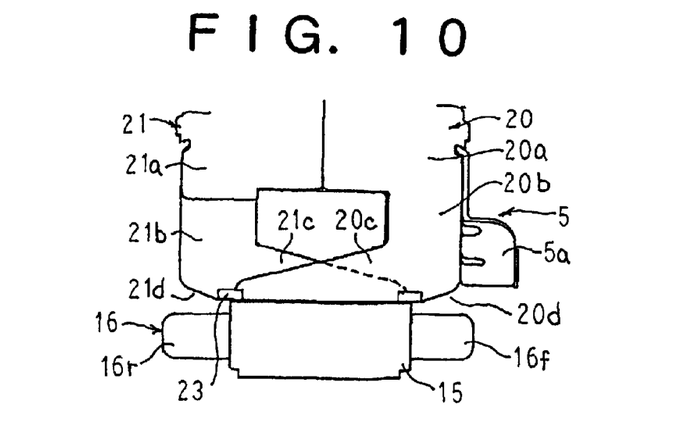
FIG. 10 is a partial cross section showing a vicinity of a stator in an automotive alternator according to Embodiment 3 of the present invention.

In Embodiment 3, as shown in FIG. 10, stainless steel rings 23, for example, functioning as claw-holding members are fitted over and secured to the claw-shaped magnetic pole portions 20c and 21c so as to restrain the tip portion ends of one of the claw-shaped magnetic pole portions 20c and 21c and the root portion ends of the other. Moreover, the rest of the construction is constructed in a similar manner to Embodiment 2 above.

According to Embodiment 3, because the rings 23 regulate vibration of the tips of the claw-shaped magnetic pole portions 20c and 21c, vibrational amplitude of the claw-shaped magnetic pole portions 20c and 21c is reduced, reducing claw resonance noise. Furthermore, because the tips of the claw-shaped magnetic pole portions 20c and 21c are prevented from spreading radially, high-speed durability is improved. In other words, incidents such as the tips of the claw-shaped magnetic pole portions 20a and 21a spreading radially, colliding with the laminated core 15, and being damaged during high-speed rotation are avoided.

Circumferential irregularities occur in root portions of the coil end groups 16f and 16r of the armature coil 16. Similarly, irregularities also occur in a circumferential direction in portions of the claw-shaped magnetic pole portions 20c and 21c facing the root portions of the coil end groups 16f and 16r. Thus, interference noise is generated between the root portions of the coil end groups 16f and 16r and the claw-shaped magnetic pole portions 20c and 21c together with rotation of the field rotor 7, increasing wind noise. In Embodiment 3, the interference noise described above is reduced by interposing the rings 23 in portions of the claw-shaped magnetic pole portions 20c and 21c facing the root portions of the coil end groups 16f and 16r, enabling wind noise to be reduced.

Embodiment 4

In Embodiment 4, winding construction of an armature coil 16A is prescribed.

Figure 11:
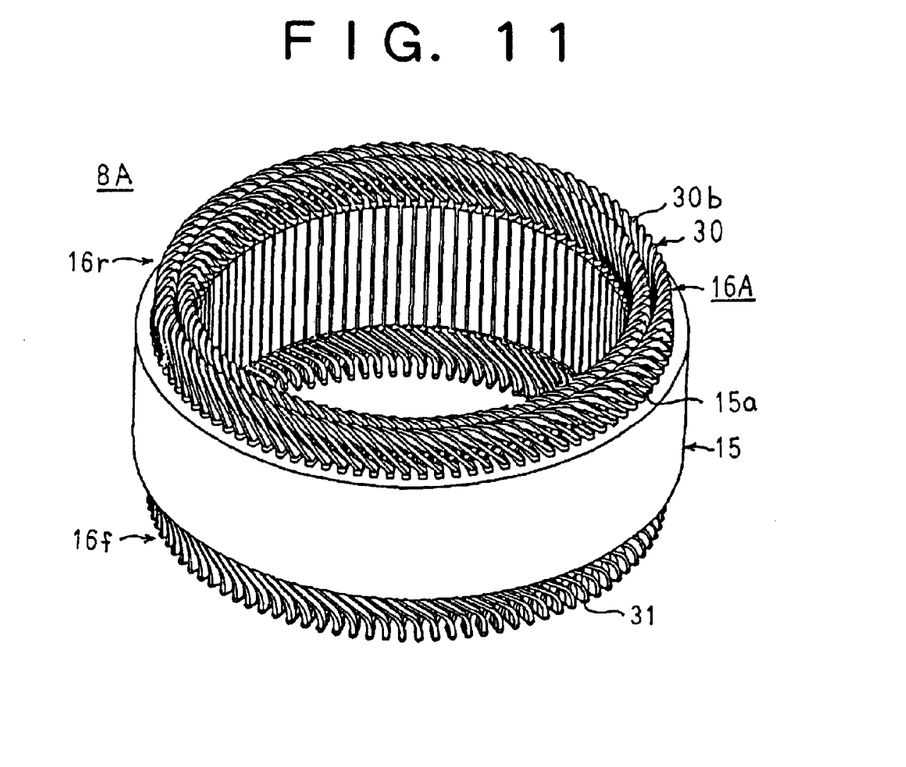
FIG. 11 is a perspective showing a stator in an automotive alternator according to Embodiment 4 of the present invention.
Figure 12:
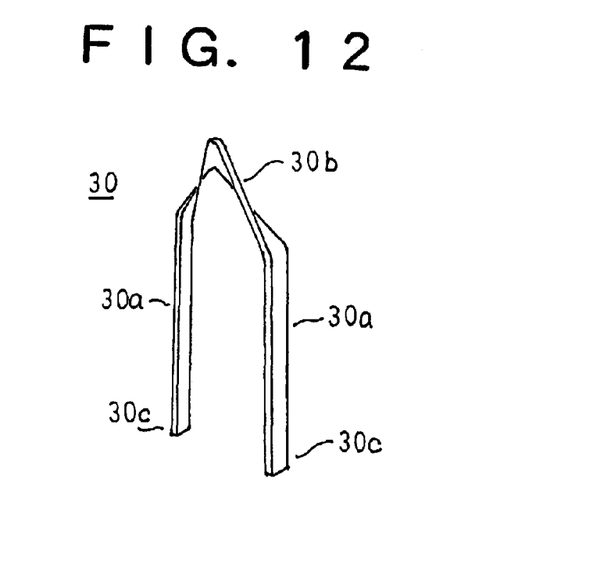
FIG. 12 is a perspective showing a conductor segment used in an armature coil of the stator in the automotive alternator according to Embodiment 4 of the present invention.

FIG. 11 is a perspective showing a stator of an automotive alternator according to Embodiment 4 of the present invention, and FIG. 12 is a perspective showing a conductor segment used in an armature coil of the stator of the automotive alternator according to Embodiment 4 of the preset invention.

A construction of the stator according to Embodiment 4 will now be explained.

As shown in FIG. 12, a conductor segment 30 functioning as a strand of wire constituting the armature coil 16A is prepared by bending a flat copper wire material covered with an electrically-insulating coating, being formed into a general U shape in which a pair of straight portions 30a are linked by a generally V-shaped turn portion 30b.

Two conductor segments 30 are inserted from one end of the laminated core 15 into each of pairs of slots 15a separated by six slots (corresponding to a pitch of one magnetic pole). Here, the straight portions 30a of one conductor segment 30 are housed in a first position from the inner radial side (hereinafter "Address 1") in one slot 15a and a second position from the inner radial side (hereinafter "Address 2") in the other slot 15a six slots away, and the straight portions 30a of the other conductor segment 30 are housed in a third position from the inner radial side (hereinafter "Address 3") in one slot 15a and a fourth position from the inner radial side (hereinafter "Address 4") in the other slot 15a six slots away. Hence, four straight portions 30a are housed in each of the slots 15a so as to line up in a single row in a radial direction. The end portions of the conductor segments 30 extending outward at the other end of the laminated core 15 are bent circumferentially into a splayed shape.

At the other end of the laminated core 15, the end portions 30c of the conductor segments 30 extending outward from Address 1 of one slot 15a of each of the slot pairs are joined together with the end portions 30c of other conductor segments 30 extending outward from Address 2 of other slots 15a six slots away, forming six single-turn wave windings. The end portions 30c of the conductor segments 30 extending outward from Address 3 of one slot 15a of each of the slot pairs are also joined together with the end portions 30c of other conductor segments 30 extending outward from Address 4 of the other slots 15a six slots away, forming six single-turn wave windings.

Moreover, although not shown, six phases of windings having four turns are formed by connecting in series each of the windings installed in the same slot group, and the armature coil 16A, which is composed of two three-phase alternating-current windings, is formed by forming three phases of windings into an alternating-current connection in each case.

In a stator 8A constructed in this manner, as shown in FIG. 11, the turn portions 30b of the conductor segments 30 forming coil ends are arranged so as to line up in two layers in single rows in a radial direction and form two rows in a circumferential direction, constituting the coil end group 16r at one end of the laminated core 15, and the joint portions 31 between the end portions 30c of the conductor segments 30 forming coil ends are arranged so as to line up in two layers in single rows in a radial direction and form two rows in a circumferential direction, constituting the coil end group 16f at the other end of the laminated core 15.

In this stator 8A, because coil ends formed by connection patterns connecting different layers in slots separated by six slots are arranged in neat rows in a circumferential direction, the cooling airflows blowing from the cooling fans 5 flow along the coil ends and are smoothed, significantly reducing wind noise. In addition, because the cooling airflows flow along the coil ends, cooling of the armature coil 16A is increased, enabling temperature increases in the stator 8A to be suppressed.

Embodiment 5

Figure 13:
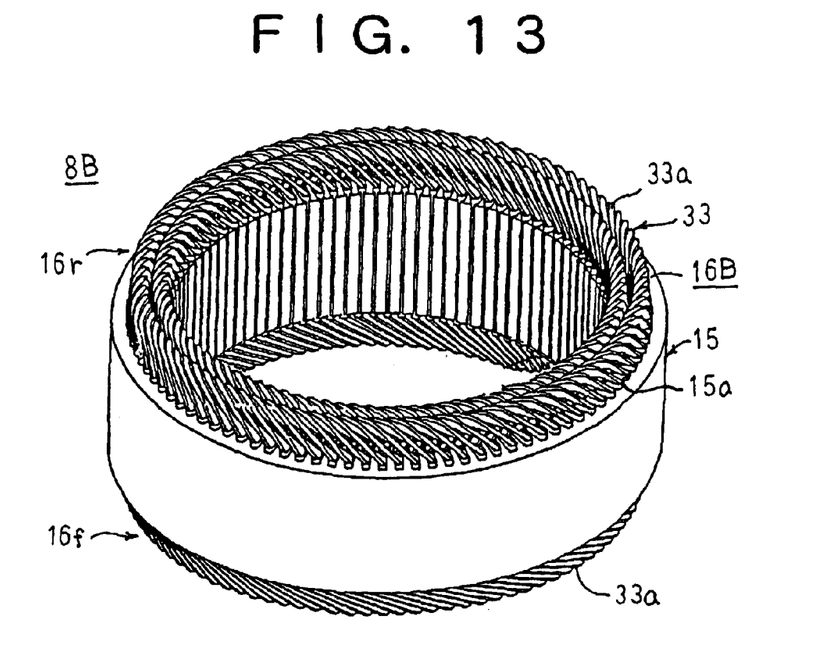
FIG. 13 is a perspective showing a stator in an automotive alternator according to Embodiment 5 of the present invention.

In Embodiment 5, as shown in FIG. 13, an armature coil 16B is prepared using continuous copper wires 33.

Moreover, Embodiment 5 is constructed in a similar manner to Embodiment 4 above except for the fact that the continuous copper wires 33 are used in place of the generally U-shaped conductor segments 30.

In a stator 8B according to Embodiment 5, because coil ends formed by connection patterns connecting different layers in slots separated by six slots are also arranged in neat rows in a circumferential direction, the cooling airflows blowing from the cooling fans 5 flow along the coil ends and are smoothed, significantly reducing wind noise. In addition, because the cooling airflows flow along the coil ends, cooling of the armature coil 16B is increased, enabling temperature increases in the stator 8B to be suppressed.

In addition, according to Embodiment 5, because the continuous copper wires 33 are used, the number of joints is significantly reduced compared to Embodiment 4 above, improving workability. Furthermore, because the coil end groups 16f and 16r are constituted by turn portions 33a of the copper wires 33, the axial length of the coil end group 16f can be lowered compared to Embodiment 4 above, reducing ventilation resistance in the coil end group 16f, thereby enabling wind noise to be reduced.

As explained above, according to one aspect of the present invention, there is provided an automotive alternator including:
 a field rotor provided with:
  a field coil; and
  a Lundell-type core having:
   a cylindrical portion on which the field coil is installed;
   yoke portions disposed so as to extend radially outward from axial end portions of the cylindrical portion; and
   claw-shaped magnetic pole portions disposed so as to extend axially from radial edge portions of the yoke portions so as to surround the field coil; and
 a stator composed of a laminated core and an armature coil disposed facing an outer circumference of the claw-shaped magnetic pole portions,
 wherein a ratio (R2/R1) between an outer radius R2 of the cylindrical portion and an outer radius R1 of the Lundell-type core is in a range from 0.50 to 0.54, and
 a ratio (Tr/Tp) between an axial overlap length Tr between the laminated core and the yoke portions and an axial length Tp of the yoke portions is in a range greater than or equal to 0.2, thereby providing an alternator enabling high output to be achieved and enabling electromagnetic noise to be reduced.

According to another aspect of the present invention, there is provided an automotive alternator including:
 a field rotor provided with:
  a field coil; and
  a Lundell-type core having:
   a cylindrical portion on which the field coil is installed;
   yoke portions disposed so as to extend radially outward from axial end portions of the cylindrical portion; and
   claw-shaped magnetic pole portions disposed so as to extend axially from radial edge portions of the yoke portions so as to surround the field coil; and
 a stator composed of a laminated core and an armature coil disposed facing an outer circumference of the claw-shaped magnetic pole portions,
 wherein a ratio Tt/R1) between a radial dimension Tt of a root portion of the claw-shaped magnetic pole portions and an outer radius R1 of the Lundell-type core is in a range from 0.1 to 0.15, and
 a ratio (T/Tp) between an axial overlap length Tr between the laminated core and the yoke portions and an axial length Tp of the yoke portions is in a range greater than or equal to 0.2, thereby providing an alternator enabling high output to be achieved and enabling electromagnetic noise to be reduced.

According to yet another aspect of the present invention, there is provided an automotive alternator including:
 a field rotor provided with:
  a field coil; and
  a Lundell-type core having:
   a cylindrical portion on which the field coil is installed;
   yoke portions disposed so as to extend radially outward from axial end portions of the cylindrical portion; and
   claw-shaped magnetic pole portions disposed so as to extend axially from radial edge portions of the yoke portions so as to surround the field coil; and
 a stator composed of a laminated core and an armature coil disposed facing an outer circumference of the claw-shaped magnetic pole portions,
 wherein a ratio (R3/R1) between a bottom portion outer radius R3 of a valley portion between the claw-shaped magnetic pole portions and an outer radius R1 of the Lundell-type core is in a range from 0.55 to 0.65, and
 a ratio Tr/Tp) between an axial overlap length Tr between the laminated core and the yoke portions and an axial length Tp of the yoke portions is in a range greater than or equal to 0.2, thereby providing an alternator enabling high output to be achieved and enabling electromagnetic noise to be reduced.

A cooling fan mounted to at least one axial end surface of the Lundell-type core may be provided, an outermost radial dimension Rf of the cooling fan being in a range greater than R4 and less than R1, where R4 is an inner radius of a root portion of the claw-shaped magnetic pole portions, reducing axial vibration of the claw-shaped magnetic pole portions, thereby reducing claw resonance noise.

A shoulder portion of the claw-shaped magnetic pole portions may be chamfered starting from an outermost radial position of the cooling fan, whereby a cooling airflow discharged from the cooling fan is supplied along the shoulder portion to cool a coil end group of the armature coil, enabling temperature increases in the armature coil to be efficiently suppressed.

A cooling fan mounted to at least one axial end surface of the Lundell-type core may be provided, an elastic resin being interposed between the cooling fan and the axial end surface of the Lundell-type core, whereby axial vibration of the claw-shaped magnetic pole portions is damped by the resin, reducing claw resonance noise.

The armature coil may have a plurality of windings formed by installing a strand of wire so as to alternately occupy an inner layer and an outer layer in slots at intervals of a predetermined number of slots in the laminated core, a coil end group thereof being constructed by arranging coil ends formed into a connection pattern in which different layers in the slots separated by a predetermined number of slots are connected in series outside an end portion of the laminated core so as to be aligned in rows in a circumferential direction, whereby a cooling airflow discharged from the cooling fan flows along the coil ends, reducing ventilation resistance, thereby reducing wind noise.

An annular claw-holding member may be disposed on tips of the claw-shaped magnetic pole portions, whereby vibrational amplitude of the claw-shaped magnetic pole portions, is reduced, reducing claw resonance noise, and radial spreading of the claw-shaped magnetic pole portions is prevented, improving high-speed durability.

what is claimed is:

1. An automotive alternator comprising:
    a field rotor provided with:
        a field coil; and
        a Lundell-type core having:
            a cylindrical portion on which said field coil is installed;
            yoke portions disposed so as to extend radially outward from axial end portions of said cylindrical portion; and
            claw-shaped magnetic pole portions disposed so as to extend axially from radial edge portions of said yoke portions so as to surround said field coil; and
    a stator composed of a laminated core and an armature coil disposed facing an outer circumference of said claw-shaped magnetic pole portions,
    wherein a ratio (R2/R1) between an outer radius R2 of said cylindrical portion and an outer radius R1 of said Lundell-type core is in a range from 0.50 to 0.54, and
    a ratio (Tr/Tp) between in axial overlap length Tr between said laminated core and said yoke portions and an axial length Tp of said yoke portions is in a range greater than or equal to 0.2.

2. The automotive alternator according to claim 1, farther comprising a cooling fan mounted to at least one anal end surface of said Lundell-type core, wherein an outermost radial dimension Rf of said cooling fan is in a range greater than R4 and less than R1, where R4 is an inner radius of a root portion of said claw-shaped magnetic pole portions.

3. The automotive alternator according to claim 2 wherein a shoulder portion of said claw-shaped magnetic pole portions is chamfered starting from an outermost radial position of said cooling fan.

4. The automotive alternator according to claim 1, further comprising a cooling fan mounted to at least one axial end surface of said Lundell-type core, wherein an elastic resin is interposed between said cooling fan and said axial end surface of said Lundell-type core.

5. The automotive alternator according to claim 1 wherein said armature coil has a plurality of windings formed by installing a strand of wire so as to alternately occupy an inner layer and an outer layer in slots at intervals of a predetermined number of slots in said laminated core, a coil end group thereof being constructed by arranging coil ends formed into a connection pattern in which different layers in said slots separated by a predetermined number of slots are connected in series outside an end portion of said laminated core so as to be aligned in rows in a circumferential direction.

6. The automotive alternator according to claim 1, further comprising an annular claw-holding member disposed on tips of said claw-shaped magnetic pole portions.

7. An automotive alternator comprising:
    a field rotor provided with:
        a field coil; and
        a Lundell-type core having:
            a cylindrical portion on which said field coil is installed;
            yoke portions disposed so as to extend radially outward from axial end portions of said cylindrical portion; and
            daw-shaped magnetic pole portions disposed so as to extend axially from radial edge portions of said yoke portions so as to surround said field coil; and
    a stator composed of a laminated core and an armature coil disposed facing an outer circumference of said claw-shaped magnetic pole portions,
    wherein a ratio (Tt/R1) between a radial dimension Tt of a root portion of said claw-shaped magnetic pole portions and an outer radius R1 of said Lundell-type core is in a range from 0.1 to 0.15, and
    a ratio (Tr/Tp) between an axial overlap length Tr between said laminated core and said yoke portions and an axial length Tp of said yoke portions is in a range greater than or equal to 0.2.

8. The automotive alternator according to claim 7, further comprising a cooling fan mounted to at least one axial end surface of said Lundell-type core, wherein au outermost radial dimension Rf of said cooling fan is in a range greater than R4 and less than R1, where R4 is an inner radius of said root portion of said claw-shaped magnetic pole portions.

9. The automotive alternator according to claim 8 wherein a shoulder portion of said claw-shaped magnetic pole portions is chamfered starting from an outermost radial position of said cooling fan.

10. The automotive alternator according to claim 7, further comprising a cooling fan mounted to at least one axial end surface of said Lundell-type core, wherein an elastic resin is interposed between said cooling fan and said axial end surface of said Lundell-type core.

11. The automotive alternator according to claim 7 wherein said armature coil has a plurality of windings formed by installing a strand of wire so as to alternately occupy an inner layer and an outer layer in slots at intervals of a predetermined number of slots in said laminated core, a coil end group thereof being constructed by arranging coil ends formed into a connection pattern in which different layers in said slots separated by a predetermined number of slots are connected in series outside an end portion of said laminated core so as to be aligned in rows in a circumferential direction.

12. The automotive alternator according to claim 7, further comprising an annular claw-holding member disposed on tips of said claw-shaped magnetic pole portions.

13. An automotive alternator comprising:
    a field rotor provided with:
        a field coil; and
        a Lundell-type core having:
            a cylindrical portion on which said field coil is installed;
            yoke portions disposed so as to extend radially outward from axial end portions of said cylindrical portion; and
            claw-shaped magnetic pole portions disposed so as to extend axially from radial edge portions of said yoke portions so as to surround said field coil; and
    a stator composed of a laminated core and an armature coil disposed facing an outer circumference of said claw-shaped magnetic pole portions,
    wherein a ratio (R3/R1) between a bottom portion outer radius R3 of a valley portion between said claw-shaped magnetic pole portions and an outer radius R1 of said Lundell-type core is in a range from 0.65 to 0.65, and
    a ratio (Tr/Tp) between an axial overlap length Tr between said laminated core and said yoke portions and an axial length Tp of said yoke portions is in a range greater than or equal to 0.2.

14. The automotive alternator according to claim 13, further comprising a cooling fan mounted to at least one axial end surface of said Lundell-type core, wherein an outermost radial dimension Rf of said cooling fan is in a range greater than R4 and less than R1, where R4 is an inner radius of a root portion of said claw-shaped magnetic pole portions.

15. The automotive alternator according to claim 14 wherein a shoulder portion of said claw-shaped magnetic pole portions is chamfered starting from an outermost radial position of said cooling fan.

16. The automotive alternator according to claim 13, further comprising a cooling fan mounted to at least one axial end surface of said Lundell-type core, wherein an elastic resin is interposed between said cooling fan and said axial end surface of said Lundell-type core.

17. The automotive alternator according to claim 13 wherein said armature coil has a plurality of windings formed by installing a strand of wire so as to alternately occupy an inner layer and an outer layer in slots at intervals of a predetermined number of slots in said laminated core, a coil end group thereof being constructed by arranging coil ends formed into a connection pattern in which different layers in said slots separated by a predetermined number of slots are connected in series outside an end portion of said laminated core so as to be aligned in rows in a circumferential direction.

18. The automotive alternator according to claim 13, further comprising an annular claw-holding member disposed on tips of said claw-shaped magnetic pole portions.

* * * * *